United States Patent
Udvari

(10) Patent No.: US 12,292,111 B2
(45) Date of Patent: May 6, 2025

(54) ARRANGEMENT FOR ENABLING A TRAVEL DRIVE OF AN AGRICULTURAL TRACTOR

(71) Applicant: DEERE & COMPANY, Moline, IL (US)

(72) Inventor: Thomas Udvari, Mannheim (DE)

(73) Assignee: DEERE & COMPANY, Moline, IL (US)

( * ) Notice: Subject to any disclaimer, the term of this patent is extended or adjusted under 35 U.S.C. 154(b) by 0 days.

(21) Appl. No.: 18/329,913

(22) Filed: Jun. 6, 2023

(65) Prior Publication Data

US 2023/0400095 A1    Dec. 14, 2023

(30) Foreign Application Priority Data

Jun. 8, 2022  (DE) .......................... 102022114360.0
Jun. 21, 2022 (DE) .......................... 102022115416.5

(51) Int. Cl.
| | |
|---|---|
| F16H 61/16 | (2006.01) |
| F16H 57/02 | (2012.01) |
| F16H 59/08 | (2006.01) |
| F16H 59/68 | (2006.01) |
| F16H 61/02 | (2006.01) |

(52) U.S. Cl.
CPC ............ *F16H 61/0246* (2013.01); *F16H 2057/02056* (2013.01); *F16H 2059/088* (2013.01); *F16H 2312/09* (2013.01)

(58) Field of Classification Search
CPC .......... F16H 61/0246; F16H 2059/088; F16H 2312/09; F16H 2057/02056; F16H 2059/6823; F16H 61/16; F16H 59/56; F16H 59/68; B60Y 2200/221
See application file for complete search history.

(56) References Cited

U.S. PATENT DOCUMENTS

| | | | | |
|---|---|---|---|---|
| 5,267,157 A | * | 11/1993 | Churchill | ............ F16H 61/0248 |
| | | | | 477/57 |
| 5,450,768 A | * | 9/1995 | Bulgrien | ......... B60W 30/18027 |
| | | | | 74/336 R |
| 6,634,983 B2 | * | 10/2003 | Nishimura | ............ B60W 10/06 |
| | | | | 477/91 |
| 2001/0034287 A1 | * | 10/2001 | Nishimura | .............. F16D 48/08 |
| | | | | 192/3.63 |
| 2017/0008397 A1 | * | 1/2017 | Kajino | ................... B60K 17/28 |

FOREIGN PATENT DOCUMENTS

| | | | | |
|---|---|---|---|---|
| GB | 2345945 A | * | 7/2000 | .............. F16H 3/14 |
| JP | 2001-280481 A | | 10/2001 | |
| JP | 2011-122689 A | | 6/2011 | |

OTHER PUBLICATIONS

European Search Report issued in Application No. 23172523.5, dated Oct. 30, 2023, 8 pages.

* cited by examiner

*Primary Examiner* — Tinh Dang

(57) ABSTRACT

An arrangement for releasing a travel drive of an agricultural tractor includes a transmission controller for engaging a travel gear by activating at least one associated clutch device, and a monitoring device, which releases the engagement of the travel gear on the part of the transmission controller when it determines the presence of a corresponding driver intention on the basis of the actuating state of at least one travel operating element.

12 Claims, 1 Drawing Sheet

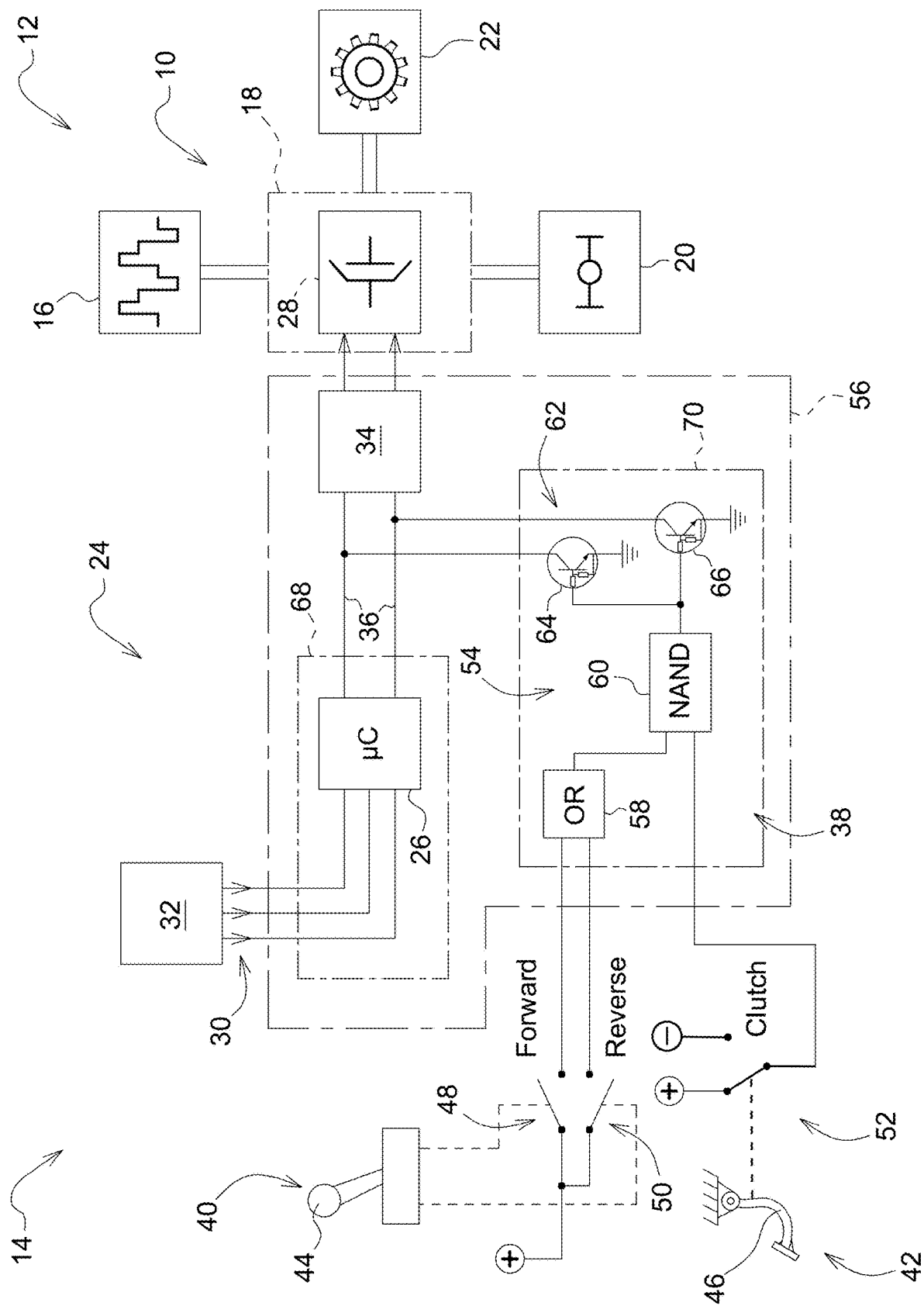

ARRANGEMENT FOR ENABLING A TRAVEL DRIVE OF AN AGRICULTURAL TRACTOR

CROSS-REFERENCE TO RELATED APPLICATIONS

This application claims priority to German Patent Application No. 102022114360.0, filed Jun. 8, 2022, and German Patent Application No. 102022115416.5, filed Jun. 21, 2022, which are hereby incorporated by reference.

FIELD OF THE DISCLOSURE

The disclosure relates to an arrangement for releasing a travel drive of an agricultural tractor.

BACKGROUND

To increase the work efficiency and the work comfort, agricultural tractors are increasingly being equipped with systems for assisting the driver.

SUMMARY

Driver assistance systems can engage automatically in a travel drive of the agricultural tractor with the goal of automatically carrying out at least those driving tasks which require increased accuracy and therefore attention of the driver. The precise discharge of seed via a row sowing unit attached to the agricultural tractor is mentioned here by way of example.

The travel drive is typically part of a drive train of the agricultural tractor and comprises, in addition to a diesel engine (or also any other desired engine), a transmission, which is in turn connected to at least one driven axle and further assemblies of the agricultural tractor.

If the engagements take place in the travel drive, to avoid vehicle reactions surprising to the driver it is necessary to take suitable countermeasures.

It is insofar the object of the present disclosure to specify an arrangement of the type mentioned at the outset such that it takes into consideration the increased safety demands upon use of driver assistance systems engaging in a travel drive.

This object is achieved by an arrangement for releasing a travel drive of an agricultural tractor having the features of one or more of the following embodiments.

The arrangement for releasing a travel drive of an agricultural tractor comprises a transmission controller for engaging a travel gear by activating at least one associated clutch device and a monitoring device, which releases the engagement of the travel gear on the part of the transmission controller when it determines the presence of a corresponding driver intention on the basis of the actuating state of at least one travel operating element.

In other words, the arrangement includes two separate control paths. A first control path, which is used for the actual transmission actuation including the activation of the at least one clutch device to engage the travel gear, and a second control path as a supervising instance to establish whether the start of the journey corresponds to the actual intention of the driver. In this way, it is ensured that the driver always maintains supervision over the agricultural tractor and it does not suddenly set itself into motion. This is important in particular in cases in which the travel gear is to be engaged on the authority of a driver assistance system provided in the agricultural tractor.

Advantageous refinements of the arrangement according to the disclosure are disclosed herein.

The at least one travel operating element can be a travel direction lever provided to specify forward or reverse travel and/or a clutch pedal for actuating the at least one clutch device.

Such travel operating elements are typically provided in agricultural tractors equipped with shift transmissions and permit a clear determination as to whether the driver of the agricultural tractor intends to initiate forward or reverse travel by selecting the travel direction via the travel direction lever and releasing the clutch pedal. The monitoring device therefore determines the presence of a corresponding driver intention when the travel direction lever assumes a position provided for carrying out forward or reverse travel and/or the clutch pedal is not actuated. As soon as the travel direction lever is in its neutral position and/or the clutch pedal is actuated, meanwhile an activation of the at least one clutch device is suppressed or interrupted on the part of the transmission controller. This is because it is then expressly undesired by the driver for the agricultural tractor to drive away.

The position of the travel direction lever and/or the actuating state of the clutch pedal is typically detected via at least one electrical switching element and transmitted to the monitoring device. In some embodiments, a separate electrical switching element is assigned to each of the two travel operating elements, wherein it can additionally be embodied as redundant to increase the reliability. The electrical switching element is designed, for example, as a contactless sensor or else as an electromechanical switch.

The monitoring device can have in this case an energy-efficient and reliable semiconductor logic for evaluating switching state signals provided via the at least one switching element. The semiconductor logic is implemented either by programming an FPGA module or else a microprocessor as part of a transmission controller.

The above and other features will become apparent from the following detailed description and accompanying drawings.

BRIEF DESCRIPTION OF THE DRAWINGS

The arrangement according to the disclosure for releasing a travel drive of an agricultural tractor will be described in more detail below on the basis of the appended drawing.

FIG. 1 an exemplary embodiment of the arrangement in the form of a schematically illustrated block diagram.

DETAILED DESCRIPTION

The embodiments or implementations disclosed in the above drawings and the following detailed description are not intended to be exhaustive or to limit the present disclosure to these embodiments or implementations.

With reference to FIG. 1, a travel drive 10 is shown, which is part of a drive train 12 of an agricultural tractor 14 (not shown) and, in addition to a diesel engine or electric motor 16, comprises a shift transmission 18, which is in turn connected to at least one driven axle 20 and further assemblies 22 of the agricultural tractor 14.

The arrangement 24 housed in the agricultural tractor 14 has a transmission control unit 56, via which a travel gear of the shift transmission 18 driven by the diesel engine or electric motor 16 may be engaged by activating at least one associated clutch device 28. The transmission control unit 56 includes a transmission controller 26 (e.g., a controller including a processor and memory). The travel gear is a forward or reverse gear of the agricultural tractor 14. The activation of the at least one clutch device 28 takes place here according to control commands 30, which are supplied to the transmission controller 26 on the part of a driver assistance system 32. To actuate the at least one clutch device 28, a power switch 34 is provided, which in turn communicates via associated differential control lines 36 with the transmission controller 26.

Furthermore, a monitoring device 38 is provided, which releases the engagement of the travel gear on the part of the transmission controller 26 when it determines the presence of a corresponding driver intention on the basis of the actuating state of a first travel operating element 40 and a second travel operating element 42.

According to the example, the first travel operating element 40 is a travel direction lever 44 provided to specify forward or reverse travel and the second travel operating element 42 is a clutch pedal 46 for actuating the at least one clutch device 28.

The two travel operating elements 40, 42 permit a clear determination as to whether the driver of the agricultural tractor 14 intends to initiate forward or reverse travel by selecting the travel direction via the travel direction lever 44 and subsequently releasing the clutch pedal 46. Vice versa, the monitoring device 38 can determine the presence of a corresponding driver intention when the travel direction lever 44 assumes a position provided for carrying out forward or reverse travel and/or the clutch pedal 46 is not actuated. As soon as the travel direction lever 44 is in its neutral position and/or the clutch pedal 46 is actuated (pressed down), meanwhile an activation of the at least one clutch device 28 is suppressed or interrupted on the part of the transmission controller 26. This is because the driver then expressly does not desire the agricultural tractor 14 to drive away.

The position of the travel direction lever 44 and/or the actuating state of the clutch pedal 46 is detected via associated electrical switching elements 48, 50, 52 and transmitted in the form of corresponding binary switching state signals "forward", "reverse", and "clutch" to the monitoring device 38. A separate electrical switching element 48, 50, 52 is assigned to each of the two travel operating elements 40, 42, wherein contrary to the illustration in FIG. 1, this switching element can additionally be embodied redundantly to increase the reliability. Therefore, the electrical switching elements 48, 50, 52 can be used as inputs for a driver assistance system 32. The electrical switching elements 48, 50, 52 are designed for this purpose as contactless sensors or else as electromechanical switches. The driver assistance system 32 can use the electrical switching elements 48, 50, 52 to determine the direction.

The monitoring device 38 has a semiconductor logic 54, which for example can be produced in CMOS technology, for evaluating the switching state signals "forward", "reverse", and "clutch". The monitoring device 38 with the semiconductor logic 54 can be a redundant element to prevent unintended movement. The semiconductor logic 54 is implemented either by programming an FPGA module or else a microprocessor as part of a transmission control unit 56 (e.g., a controller including a processor and memory) and comprises an OR gate 58 for linking the switching state signals "forward" or "reverse" coming from the electrical switching elements 48, 50 of the travel direction lever 44 and a NAND gate 60 connected on the input side to the output OUT_1 of the OR gate 58, to which furthermore the switching state signals "clutch" of the electrical switching element 52 of the clutch pedal 46 are supplied. Two semiconductor switches 62 in the form of associated transistors 64, 66 are in turn located at the output OUT_2 of the NAND gate 60. If the two transistors 64, 66 conduct (if OUT_2=1), these short-circuit the differential control lines 36 of the transmission controller 26 to ground. Actuation of the at least one clutch device 28 for the purpose of starting travel is then precluded.

If the clutch pedal 46 is not actuated, then the electrical switching element 52 is connected to "+" which equals "1". If either the electrical switching element 48 (forward) or the electrical switching element 50 (reverse) are "1" and the electrical switching element 52 is "1", then OUT_2 becomes zero. The transistors 64, 66 do not switch to ground and do not override the differential control lines 36. The tractor can go into motion.

If the clutch pedal 46 is actuated, then the electrical switching element 52 is connected to "−" which equals "0". OUT_2 becomes "1" regardless of the electrical switching elements 48 (forward) and 50 (reverse) The transistors 64 and 66 switch to ground and override the control lines 36. The tractor cannot go into motion.

Overall, the following switching state or truth table results:

| Forward | 0 | 1 | 0 | 0 | 1 | 0 |
|---|---|---|---|---|---|---|
| Reverse | 0 | 0 | 1 | 0 | 0 | 1 |
| OUT_1 | 0 | 1 | 1 | 0 | 1 | 1 |
| Clutch | 0 | 0 | 0 | 1 | 1 | 1 |
| OUT_2 | 1 | 1 | 1 | 1 | 0 | 0 |

The following assignments are to apply for this purpose:
Forward=0, if travel direction lever 44 is in neutral position;
Reverse=0, if travel direction lever 44 is in neutral position; and
Clutch=0, if clutch pedal 46 is actuated.

As can be inferred from the table, a release of the transmission controller 26 takes place in the arrangements represented by the last two columns.

In summary, the arrangement 24 depicted in FIG. 1 thus includes two separate control paths 68, 70. A first control path 68, which is used for the actual transmission actuation including the activation of the at least one clutch device 28 to engage the travel gear, and a second control path 70 as a supervising instance to establish whether the start of the travel corresponds to the actual intention of the driver.

This ensures that the driver always maintains supervision over the agricultural tractor 14 and it does not suddenly set itself into motion.

The terminology used herein is for the purpose of describing example embodiments or implementations and is not intended to be limiting of the disclosure. As used herein, the singular forms "a," "an," and "the" are intended to include the plural forms as well, unless the context clearly indicates otherwise. It will be further understood that the any use of the terms "has," "includes," "comprises," or the like, in this specification, identifies the presence of stated features, integers, steps, operations, elements, and/or components, but does not preclude the presence or addition of one or more other features, integers, steps, operations, elements, components, and/or groups thereof.

Those having ordinary skill in the art will recognize that terms such as "above," "below," "upward," "downward,"

"top," "bottom," etc., are used descriptively for the FIGURES, and do not represent limitations on the scope of the present disclosure, as defined by the appended claims. Furthermore, the teachings may be described herein in terms of functional and/or logical block components or various processing steps, which may include any number of hardware, software, and/or firmware components configured to perform the specified functions.

Terms of degree, such as "generally," "substantially," or "approximately" are understood by those having ordinary skill in the art to refer to reasonable ranges outside of a given value or orientation, for example, general tolerances or positional relationships associated with manufacturing, assembly, and use of the described embodiments or implementations.

As used herein, "e.g.," is utilized to non-exhaustively list examples and carries the same meaning as alternative illustrative phrases such as "including," "including, but not limited to," and "including without limitation." Unless otherwise limited or modified, lists with elements that are separated by conjunctive terms (e.g., "and") and that are also preceded by the phrase "one or more of" or "at least one of" indicate configurations or arrangements that potentially include individual elements of the list, or any combination thereof. For example, "at least one of A, B, and C" or "one or more of A, B, and C" indicates the possibilities of only A, only B, only C, or any combination of two or more of A, B, and C (e.g., A and B; B and C; A and C; or A, B, and C).

While the above describes example embodiments or implementations of the present disclosure, these descriptions should not be viewed in a restrictive or limiting sense. Rather, there are several variations and modifications which may be made without departing from the scope of the appended claims.

What is claimed is:

1. An arrangement for enabling a travel drive of an agricultural tractor, comprising:
   a transmission controller for engaging a travel gear by activating at least one associated clutch device;
   a manual transmission mode operable via a clutch pedal for actuating the at least one associated clutch device and a travel direction lever provided to specify forward or reverse travel; and
   a monitoring device, which enables the engagement of the travel gear on the part of the transmission controller when it determines, in the manual transmission mode, the presence of a corresponding driver intention on the basis of an actuating state of one or more of the travel direction lever and the clutch pedal;
   wherein the monitoring device determines, in the manual transmission mode, the presence of a driver intention to not set the agricultural tractor into motion on the basis of the actuating state of one or more of the travel direction lever and the clutch pedal, and wherein the monitoring device precludes engagement of the travel gear when the driver intention to not set the agricultural tractor into motion is determined.

2. The arrangement of claim 1, wherein the monitoring device determines the presence of a corresponding driver intention when one or more of the travel direction lever assumes a position provided for carrying out forward or reverse travel and the clutch pedal is not actuated.

3. The arrangement of claim 2, wherein one or more of the position of the travel direction lever and the actuating state of the clutch pedal is detected via at least one electrical switching element and transmitted to the monitoring device.

4. The arrangement of claim 3, wherein the monitoring device has a semiconductor logic for evaluating switching state signals provided via the at least one switching element.

5. The arrangement of claim 1, wherein the driver intention to not set the agricultural tractor into motion is determined by the monitoring device when the travel direction lever is in its neutral position or when the clutch pedal is pressed down or both.

6. The arrangement of claim 1, further comprising two separate control paths including:
   a first control path which is used for activation of the at least one associated clutch device to engage the travel gear; and
   a second control path as a supervising instance to establish whether a start of travel corresponds to an actual driver intention, wherein the second control path is controlled by the monitoring device.

7. An agricultural tractor comprising:
   a transmission controller for engaging a travel gear by activating at least one associated clutch device;
   a manual transmission mode operable via a clutch pedal for actuating the at least one associated clutch device and a travel direction lever provided to specify forward or reverse travel; and
   a monitoring device, which enables the engagement of the travel gear on the part of the transmission controller when it determines, in the manual transmission mode, the presence of a corresponding driver intention on the basis of an actuating state of one or more of the travel direction lever and the clutch pedal;
   wherein the monitoring device determines, in the manual transmission mode, the presence of a driver intention to not set the agricultural tractor into motion on the basis of the actuating state of one or more of the travel direction lever and the clutch pedal, and wherein the monitoring device precludes engagement of the travel gear when the driver intention to not set the agricultural tractor into motion is determined.

8. The agricultural tractor of claim 7, wherein the monitoring device determines the presence of a corresponding driver intention when one or more of the travel direction lever assumes a position provided for carrying out forward or reverse travel and the clutch pedal is not actuated.

9. The agricultural tractor of claim 8, wherein one or more of the position of the travel direction lever and the actuating state of the clutch pedal is detected via at least one electrical switching element and transmitted to the monitoring device.

10. The agricultural tractor of claim 9, wherein the monitoring device has a semiconductor logic for evaluating switching state signals provided via the at least one switching element.

11. The agricultural tractor of claim 7, wherein the driver intention to not set the agricultural tractor into motion is determined by the monitoring device when the travel direction lever is in its neutral position or when the clutch pedal is pressed down or both.

12. The agricultural tractor of claim 7, further comprising two separate control paths including:
   a first control path which is used for activation of the at least one associated clutch device to engage the travel gear; and
   a second control path as a supervising instance to establish whether a start of travel corresponds to an actual driver intention, wherein the second control path is controlled by the monitoring device.

* * * * *